United States Patent [19]

Deminet

[11] 4,238,265
[45] Dec. 9, 1980

[54] METHOD OF MANUFACTURING A GLASS PARABOLIC-CYLINDRICAL SOLAR COLLECTOR

[75] Inventor: Czeslaw Deminet, Kent, Wash.
[73] Assignee: The Boeing Company, Seattle, Wash.
[21] Appl. No.: 955,258
[22] Filed: Oct. 27, 1978
[51] Int. Cl.³ .............................................. G02B 5/10
[52] U.S. Cl. .................................... 156/221; 156/222; 156/224; 264/1; 350/293; 350/296; 350/310; 428/116; 428/434
[58] Field of Search .............. 156/221, 222, 224, 197; 264/1; 350/293, 310, 296, 320

[56] References Cited
U.S. PATENT DOCUMENTS

| | | | |
|---|---|---|---|
| 3,841,738 | 10/1974 | Caplan | 350/293 |
| 3,912,380 | 10/1975 | Klein | 350/293 |
| 4,124,277 | 11/1978 | Stang | 350/310 |

Primary Examiner—George F. Lesmes
Assistant Examiner—E. Rollins Buffalow
Attorney, Agent, or Firm—Cole, Jensen & Puntigam

[57] ABSTRACT

The method includes the following steps: (1) a microsheet of glass is drawn from a glass melt; (2) a reflective layer, such as silver, is deposited on one surface of the microsheet; (3) a first flexible backing layer, such as fiberglass, is bonded to the reflective layer; (4) the combination of the microsheet with the reflective layer and the first backing layer is formed over a mandrel which is preferably in the form of a parabolic cylinder; and (5) a honeycombed layer, with a second fiberglass backing layer, is then bonded to the first backing layer. The product produced by the steps 1–5 is then cured so that it retains the desired configuration; i.e. parabolic-cylindrical, after it is removed from the mandrel.

8 Claims, 4 Drawing Figures

METHOD OF MANUFACTURING A GLASS PARABOLIC-CYLINDRICAL SOLAR COLLECTOR

BACKGROUND OF THE INVENTION

This invention relates generally to the art of solar collectors, and more specifically concerns curved solar collectors which are made of glass.

If solar collectors are to become an economical source of power, they must not only be as efficient as possible, but they should also be resistant to weather damage and chemical degradation. They should furthermore be lightweight, inexpensive, and should have a low coefficient of expansion.

The configuration of a solar collector has a significant impact on efficiency, while the materials used in the construction of a solar collector significantly impact the other considerations. With respect to solar collector configuration, it is known that a parabolic shape is very efficient, while with respect to materials, plastic, aluminum and glass have been used. Glass has many characteristics which make it an especially good choice for use in solar collectors, inlcuding its good surface qualities, its high transmittance, its excellent chemical durability and its high resistance to ultraviolet. Also, glass is relatively inexpensive and is readily available.

Glass would thus be otherwise preferred were it not for several significant disadvantages. A first and primary disadvantage is that it has heretofore been very difficult to form glass into the desired shape with the degree of accuracy required. For instance, it is preferred that the curve of parabolic reflectors be accurate to within 1/10th of a degree. However, this degree of accuracy is currently not available.

Secondly, current processes require a considerable amount of handling, and cannot realistically be automated. Hence, the resulting product is rather expensive, even though the raw material is relatively inexpensive. Further, a crack in a glass reflector will usually propagate, even if the glass is bonded to a support surface, and hence, damage to such a reflector is most often not confined to just a local impact area.

Because of such disadvantages, glass has not been used extensively for curved collectors.

Accordingly, it is a general object of the present invention to provide a method for producing a product, and the product itself, which overcomes one or more of the disadvantages of the prior art noted above.

It is a further object of the present invention to provide such a method by which curved glass solar collectors can be produced inexpensively.

It is another object of the present invention to provide such a method by which a very accurate curved solar collector is produced.

It is an additional object of the present invention to provide such a product in which the effect of damage to the collector is confined to a localized area.

It is a still further object of the present invention to provide such a process which is capable of being automated into a continuous process.

SUMMARY OF THE INVENTION

Accordingly, the present invention is a method of manufacturing a curved glass solar collector, comprising the steps of (1) forming a microsheet of glass, (2) depositing a layer of reflective material on one surface of the microsheet; (3) bonding a first backing layer to the reflective layer previously deposited on the microsheet, (4) forming the combination of the reflective microsheet with the first backing layer about a mandrel of desired configuration, and (5) bonding a support element to the first backing layer when the combination of the reflective microsheet and the first backing layer is in the desired configuration on the mandrel, so that the resulting collector structure will remain in the desired configuration after it is removed from the mandrel.

The present invention includes the product produced by the process specified above and also is a solar collector comprising (1) a base layer of a microsheet of glass, (2) a layer of reflective material deposited on one surface of the microsheet layer, (3) a first backing layer bonded to the layer of reflective material, and (4) a support element layer bonded to the first backing layer.

DESCRIPTION OF THE DRAWINGS

A more thorough understanding of the invention may be obtained by a study of the following detailed description taken in connection with the accompanying drawings in which.

DESCRIPTION OF THE PREFERRED EMBODIMENT

Figure 1:
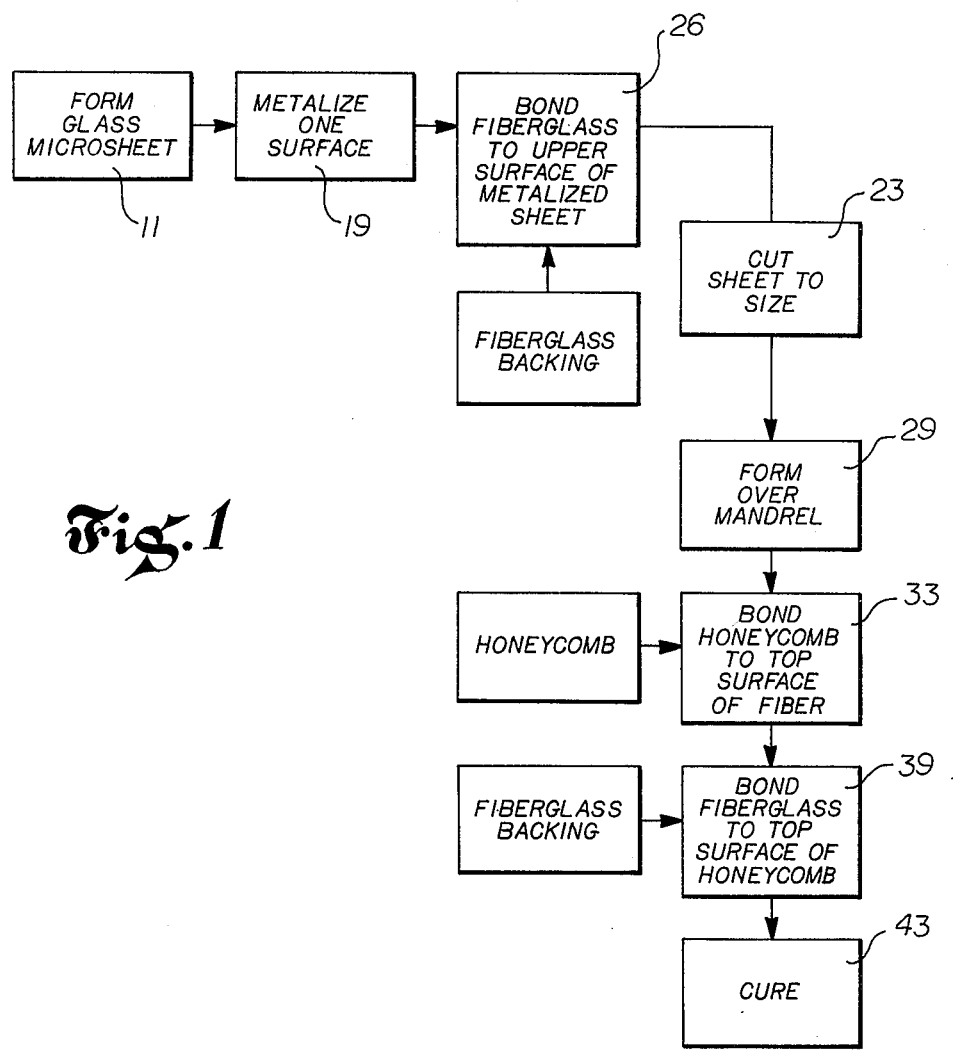
FIG. 1 is a block diagram showing the steps in the process of the present invention.
Figure 2:
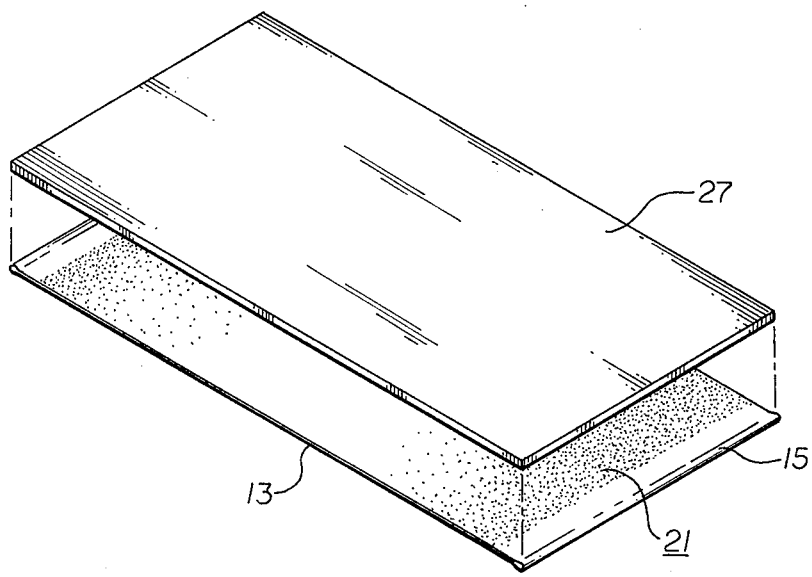
FIG. 2 is an isometric view of the product at a first point in the process of FIG. 1.
Figure 4:
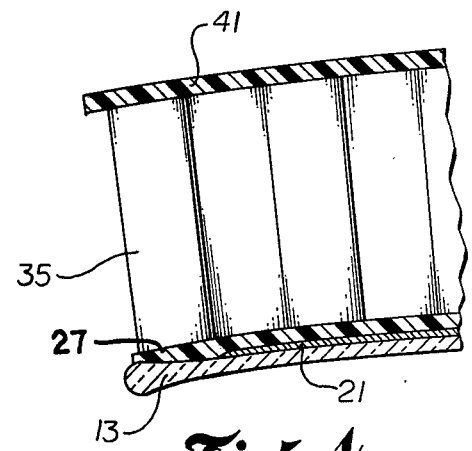
FIG. 4 is a partial cross-section of the completed product of the process of FIG. 1.

FIG. 1 shows, in block diagram form, the sequence of steps in one embodiment of the process of the present invention. The first step in the process, shown in block 11, is to form a microsheet 13 of glass from a glass melt. The term microsheet of glass refers to a very thin sheet of glass, on order of 0.004 inches to 0.04 inches, which is characterized by a capability of a certain amount of flexibility without fracture. Microsheet glass is commercially available from various manufacturers, one being Corning Glass Works, of Corning, New York. The microsheet is usually drawn vertically from a glass melt and may be a continuous process. In the drawing process, a heavy bead 15 forms along each edge of the microsheet. This bead, which is more clearly shown in FIGS. 2 and 4, is usually several times as thick as the microsheet and provides a convenient way to handle the microsheet in the further steps of the process.

The microsheet 13, with its edge beads 15, is then directed onto a conveyor (not shown) which moves the microsheet to the location of the second step in the process. In the second step, as shown in block 19, a layer 21 of reflecting material is deposited, such as by conventional vacuum deposition methods, on one surface of the microsheet 13 to produce a reflective microsheet 16. Typically, the reflecting material will be silver, of commercial mirror thickness, i.e. 1000 Angstroms. Silver is used in the embodiment described because of its very high reflectivity. However, aluminum may also be used successfully, particularly in applications where resistance to tarnishing is important. However, aluminum does not have as high a value of reflectivity as silver.

The reflective microsheet is then transported by the conveyor to a teflon table, not shown, on which it is positioned glass side down, reflective side up. In the next step in the process, a relatively thin backing sheet 27, shown by block 25, is bonded to the reflective surface of the microsheet, shown by block 26. The first backing sheet 27, in the embodiment shown, is approximately 0.020–0.040 inches and is flexible. Fiberglass is used for the backing material in the embodiment shown, but other materials such as styrofoam, may be used successfully.

In the bonding step, block 26, a conventional fast curing adhesive, such as an epoxy, is applied to the lower surface of the first backing layer 27. The first backing layer is then applied with enough force to the exposed reflective layer on the microsheet, so that a secure bond results.

The continuous reflective microsheet 16, with the flexible backing, is then cut into sections of desired size for the follow-on steps in the process, as shown at block 23. Although these sections may, of course, be of various dimensions, depending on the eventual application of the product, one possible size is 30" by 8', which is a currently convenient size for solar collectors.

The result of the above steps in the process is shown in FIG. 2, which shows the microsheet 13 with beads 15 and the reflective layer 21. The first backing layer 27 is shown exploded away from the reflective microsheet.

In the next step in the process, shown in block 29, the combination of the reflective microsheet 16 and the first backing layer 27 is placed on a mandrel 31 (FIG. 3) of desired form before the adhesive cures. The combination drapes over the mandrel and is then drawn down on the mandrel such that the lower glass surface of the microsheet conforms exactly to the shape of the mandrel 31. This is typically done by mechanical means, such as a vacuum clamp operating from above. The microsheet is held by the beads along its edges. The backing 27 is thin enough that the microsheet may be accurately conformed to the form of the mandrel, but is thick enough, and also sufficiently flexible, to prevent the microsheet from cracking as it is formed over the mandrel.

Figure 3:
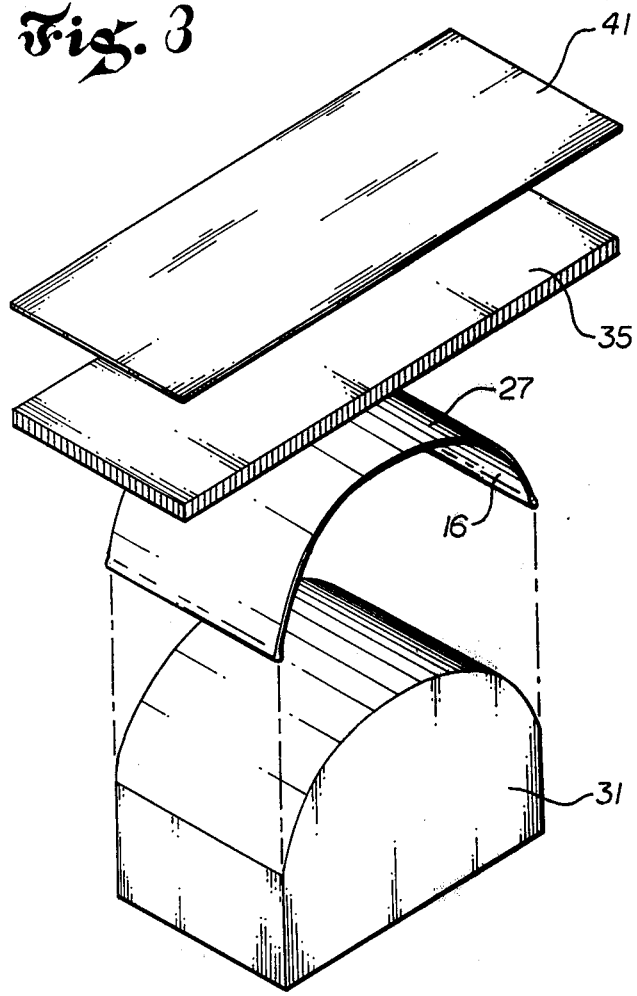
FIG. 3 is an isometric view of the product produced at a second, later point in the process of FIG. 1.

The mandrel 31 may be formed by precise machining to the desired form, such as shown in FIG. 3, or it may be cast, such as from plaster of paris. In the embodiment shown, the form of the mandrel is parabolic-cylindrical, but it could be other configurations as well.

The step of forming the combination of the microsheet and the backing layer over the mandrel is accomplished before the adhesive cures, so as to permit a certain amount of shifting between the reflecting microsheet and the backing 27. This further assists in preventing cracking of the microsheet. By so forming the combination of reflecting microsheet and flexible backing combination over a mandrel, a glass reflector having a very accurate curve may be produced, without heating. This results in a substantial saving of both time and expense.

The next step in the process is shown in block 33. A layer 35 of honeycombed material, which is approximately ⅜ inch thick, is placed on top of the first backing layer 27. The honeycombed layer 35 is, in the embodiment shown, made of a polymer impregnated paper, or aluminum, such as used in the aircraft industry, so that it is flexible and lightweight. The honeycomb configuration itself is conventional. The honeycomb layer is bonded to the top surface of the backing layer 27 by a conventional fast-drying adhesive, and provides the stiff support necessary for the collector structure.

In the next step of the process, as shown in block 39, a second flexible backing layer 41 is bonded to the top surface of the honeycomb layer 35. The second backing layer 41 has been previously cut to size and may be of the same material as the first backing layer 27. The honeycomb openings are thus closed off on both surfaces of layer 35 by, respectively, backing layers 27 and 41. The combination of the first and second backing layers and the honeycomb layer thus provides a very strong but lightweight support for the reflective microsheet glass.

At this point in the process, the adhesive holding the various elements together has not yet completely cured, so before the completed collector is removed from the mandrel, the curing must be completed, to fix the elements of the collector in the exact configuration they are in on the mandrel. In the present process, the mandrel and the collector are now surrounded by a device referred to in the art as a vacuum bag, which is a conventional device for establishing a vacuum. A 10 psi vacuum is usually sufficient. The vacuum forces the microsheet against the mandrel and forces the elements of the collector together under a uniform pressure. The use of the vacuum bag makes the application of pressure fast, accurate and uniform, so that a uniform bond between the elements occurs rapidly, and so that the collector has a very accurate curve.

The result is a curved reflector structure suitable for use as a solar collector, which has a very accurate curve and which is relatively inexpensive to produce. The structure can be used as part of a conventional solar energy system, or it can be used to concentrate the sun's rays into a conventional solar cell. A partial cross-section, amplified view of the curved reflector is shown in FIG. 4. The base layer of the reflector is the microsheet 13 with the reflecting layer 21 being on one surface thereof. Following in succession are the first backing layer 27, the honeycomb layer 35, and the second backing layer 41.

The reflector is lightweight and yet extremely strong. Since its reflecting structure is glass, it has all the advantages noted above of a conventional glass reflector, but because of its novel construction, does not have its disadvantages. Glass parabolic reflectors thus become a practical alternative in the solar energy field. With applicant's process, for instance, such reflectors are relatively inexpensive to produce, thus overcoming one of the major disadvantages of the prior art. Further, damage to the reflector is usually confined to the local area of actual impact, because the microsheet glass layer, being very thin, does not propagate cracks.

The lightweight of the reflector results in a further advantage, in that the reflector may be easily rotated upside down when not in use, so that the reflective surface is protected from hail, sandstorm, and similar damage.

Although an exemplary embodiment of the present invention has been disclosed herein, it should be understood that various changes, modifications and substitutions may be incorporated in such embodiment shown without departing from the spirit of the invention which is defined by the claims which follow.

What is claimed is:

1. A method of manufacturing a curved glass solar collector, comprising the steps of:
   (1) forming a microsheet of glass on order of 0.004 inches–0.040 inches;

(2) depositing a layer of reflective material on one surface of said microsheet of glass, thereby forming a reflective microsheet;

(3) placing a first backing layer means of flexible, but otherwise relatively stiff, material on top of the reflective microsheet so that the reflective microsheet can be moved without breaking, with an uncured adhesive between said first backing layer means and the reflective microsheet, so that the combination of the reflective microsheet and said first backing layer means can be moved together without the reflective microsheet separating from said first backing layer means, but so that the reflective microsheet and said first backing layer means can move sideways relative to each other;

(4) moving the combination of the reflective microsheet and said first backing layer means to a mandrel of desired configuration;

(5) forming the combination about the mandrel during the time that the adhesive between the reflective microsheet and said first backing layer means remains uncured;

(6) forming a support element layer means on top of said first backing layer means, with an uncured adhesive between said support element layer means and said first backing layer means; and (7) maintaining the resulting product of steps 1-6 above in place of the mandrel until the adhesive between the reflective microsheet and said first backing layer means and between said first backing layer means and said support element layer means cures sufficiently that the resulting product remains in the desired configuration after it is removed from the mandrel.

2. The method of claim 1, wherein said support element layer means is a flexible, honeycomb-like material, and wherein the method includes the further step of bonding a second backing layer means of flexible, but relatively stiff, material to the top of said support element layer means.

3. The method of claim 1, wherein the step of forming the microsheet of glass includes the step of drawing the microsheet of glass from a glass melt in such a manner as to form beads of glass along the respective edges of the microsheet, wherein the beads of glass have a diameter substantially greater than the thickness of the microsheet.

4. The method of claim 1, wherein the step of forming the product of steps 1-3 about a mandrel is characterized by an absence of external heat being applied to said microsheet.

5. The method of claim 1, wherein the step of maintaining includes the step of placing the product in a vacuum during the time it is curing.

6. The method of claim 1, wherein the step of forming the product of steps 1-3 about the mandrel occurs prior to the time that the adhesive bonding said first backing layer to said reflective layer is completely cured.

7. The method of claim 1, wherein the thickness of said layer of reflective material is approximately the same as that for a mirror.

8. The method of claim 1, wherein said desired configuration is parabolic-cylindrical.

* * * * *

UNITED STATES PATENT AND TRADEMARK OFFICE
CERTIFICATE OF CORRECTION

PATENT NO. : 4,238,265
DATED : December 9, 1980
INVENTOR(S) : Czeslaw Deminet

It is certified that error appears in the above—identified patent and that said Letters Patent are hereby corrected as shown below:

Claim 1, column 5, line 28, the word "of" should be --on--.

Signed and Sealed this

Twenty-fourth Day of March 1981

[SEAL]

Attest:

RENE D. TEGTMEYER

*Attesting Officer*  *Acting Commissioner of Patents and Trademarks*